W. E. ANDREWS.
ELECTRICAL WELDING APPARATUS.
APPLICATION FILED NOV. 9, 1914.
1,141,517.
Patented June 1, 1915.
3 SHEETS—SHEET 1.
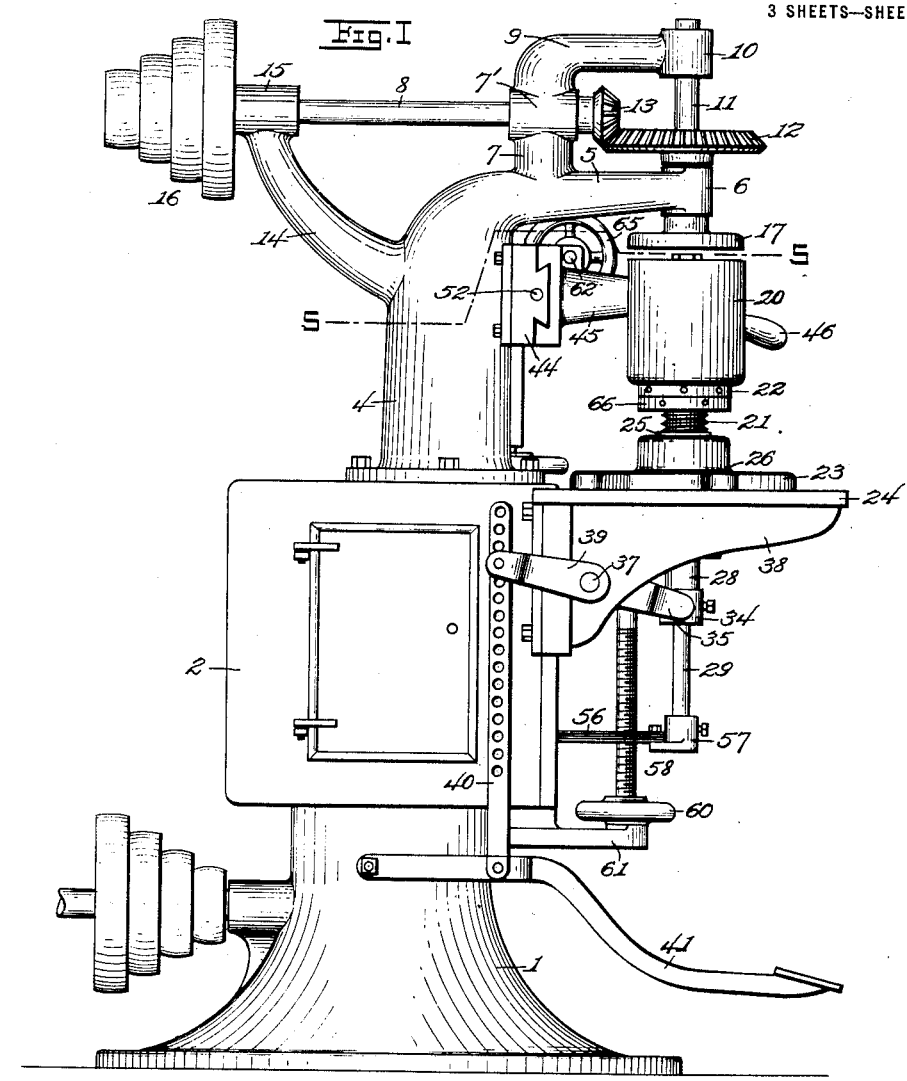
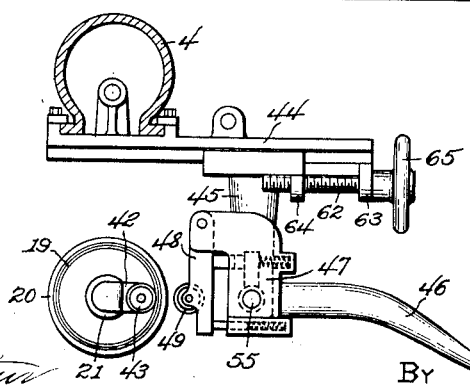
WITNESSES:
F. E. Arthur
W. F. Keefer
INVENTOR—
W. E. Andrews
BY
N. E. Dunlap
ATTORNEY W. E. ANDREWS.
ELECTRICAL WELDING APPARATUS.
APPLICATION FILED NOV. 9, 1914.
1,141,517.
Patented June 1, 1915.
3 SHEETS—SHEET 2.
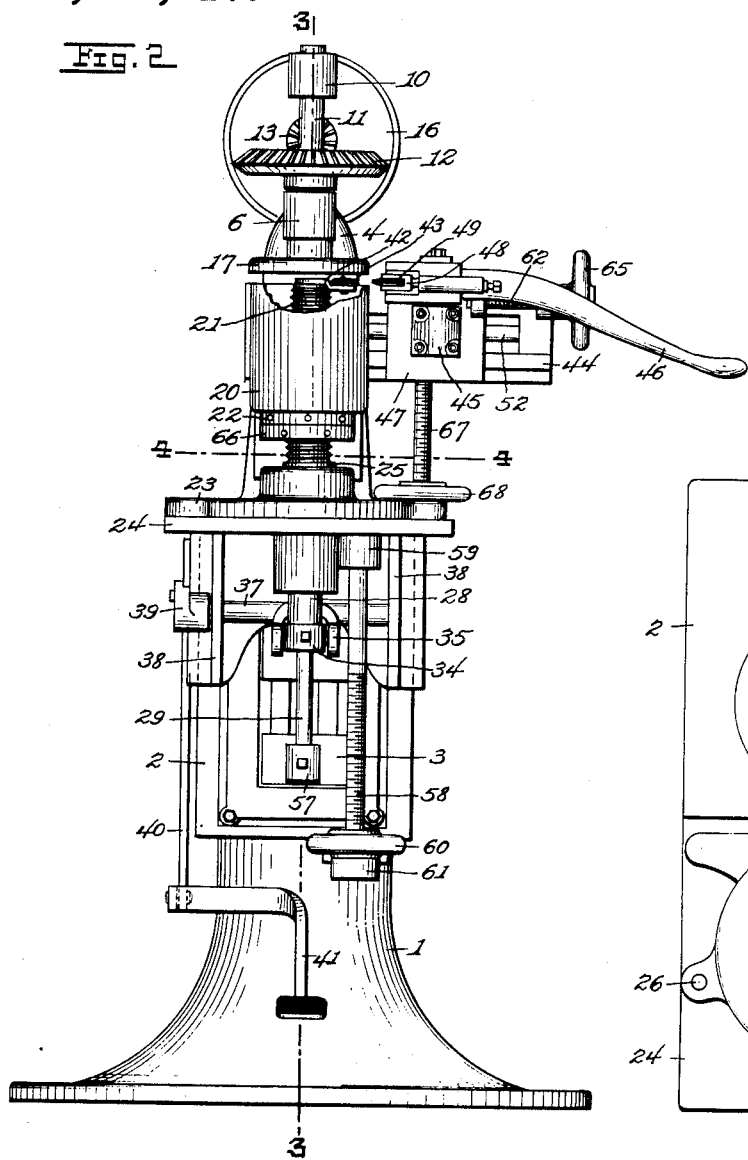
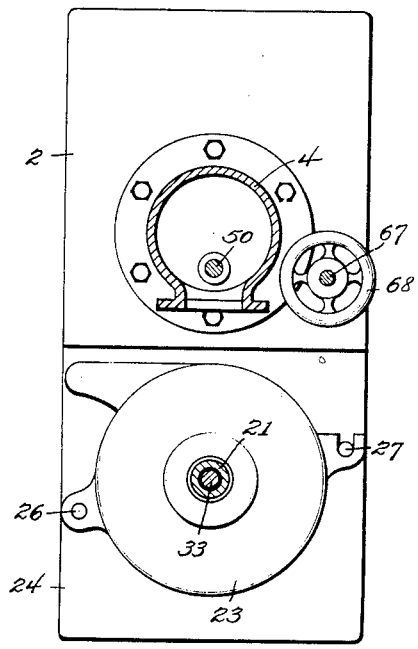
WITNESSES:
F. E. Arthur
W. F. Keefer.
INVENTOR
W. E. Andrews
BY
W. E. Dunlap
ATTORNEY W. E. ANDREWS.
ELECTRICAL WELDING APPARATUS.
APPLICATION FILED NOV. 9, 1914.
1,141,517.
Patented June 1, 1915.
3 SHEETS—SHEET 3.
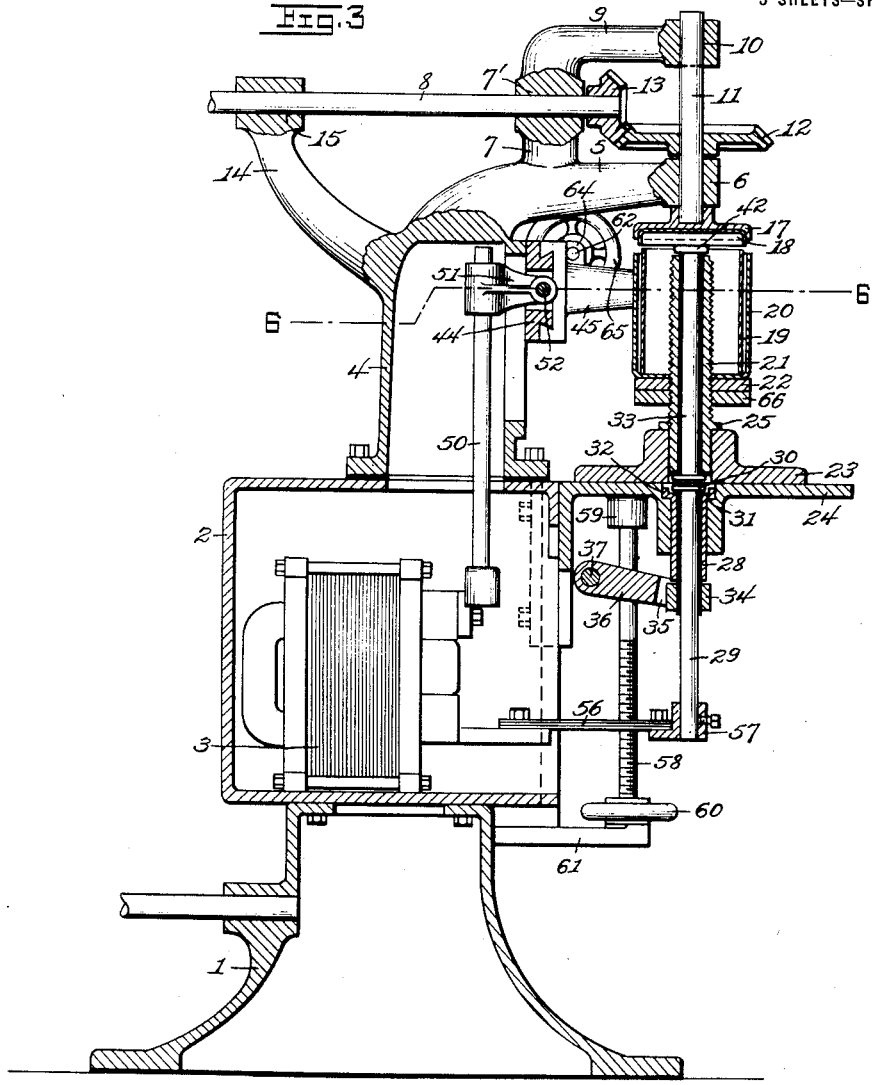
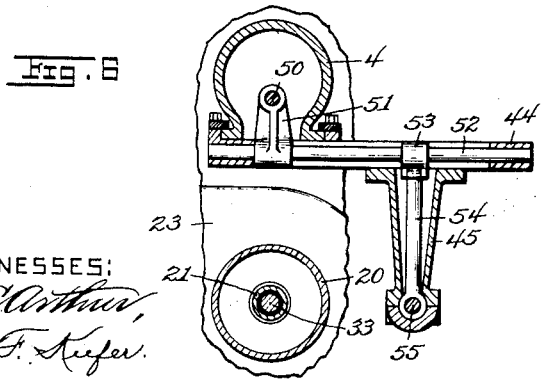
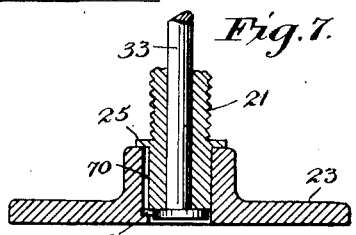
WITNESSES:
INVENTOR—
W. E. Andrews.
BY
N. E. Dunlap,
ATTORNEY.

UNITED STATES PATENT OFFICE.

WILLIAM E. ANDREWS, OF BELLAIRE, OHIO, ASSIGNOR OF ONE-HALF TO W. A. STELLERS, OF BELLAIRE, OHIO.

ELECTRICAL WELDING APPARATUS.

1,141,517.  Specification of Letters Patent.  Patented June 1, 1915.

Application filed November 9, 1914. Serial No. 870,988.

*To all whom it may concern:*

Be it known that I, WILLIAM E. ANDREWS, a citizen of the United States of America, and resident of Bellaire, county of Belmont, and State of Ohio, have invented certain new and useful Improvements in Electrical Welding Apparatus, of which the following is a specification.

This invention relates broadly to electric welding apparatus, and more particularly to a machine for welding annular seams or joints of cylindrical or tubular sheet metal articles.

The primary object of the invention is to provide a machine whereby circular bottoms or ends may be electrically welded to the hollow cylindrical sheet metal bodies of pots, kettles, cans and other articles of like nature, which machine is adapted to produce a joint wherein the meeting edges are so closely united as to be practically imperceptible, especially after the application thereto of an enamel coating.

A further object is to provide a machine of the character mentioned which is adapted for use in connection with articles of widely varying forms and sizes.

With these and other objects in view, the invention resides in the features of construction, arrangement of parts and combinations of elements which will hereinafter be fully described, reference being had to the accompanying drawings, forming a part of this specification, in which—

Figure 1 is a side elevation of the invention; Fig. 2 is a front elevation of the same; Fig. 3 is a longitudinal section; Fig. 4 is a horizontal section on the line 4—4, Fig. 2; Fig. 5 is a similar section on the line 5—5, Fig. 1; Fig. 6 is a similar section on line 6—6, Fig. 3; and Fig. 7 is an enlarged detail section of the guide plate and certain associated parts.

Referring to said drawings, in which like designating characters distinguish like parts throughout the several views—1 indicates a base or support upon which is mounted a casing 2 having disposed therein a transformer 3 through which electric current is supplied for welding, as will hereinafter be explained. Mounted in a stationary position upon the top of the casing 2 is the base of a hollow pedestal 4 having a forwardly directed arm 5 provided with a vertically disposed shaft-bearing 6 in its end. Surmounting said arm 5 and preferably formed integral with the latter is an upright body 7 in which is formed a bearing 7' for a horizontally disposed shaft 8 and which carries thereon a forwardly directed arm 9 having in its end a shaft-bearing 10 which is in vertical alinement with said shaft-bearing 6. A vertically-disposed shaft 11 is journaled in said bearings 6 and 10 and carries thereon at a suitable point a bevel gear 12 in mesh with a smaller bevel gear 13 carried on the adjacent end of the shaft 8. A rearwardly and upwardly inclined arm 14 formed on said pedestal 4 carries on its end a second bearing 15 for said shaft 8, which latter carries thereon at a suitable point a stepped pulley 16. As is obvious, power is transmitted through said shaft 8 for driving said shaft 11.

The vertical shaft 11 has fixed on its lower end a shallow holder 17 designed to support therein an annularly flanged blank 18 adapted to constitute the bottom of the vessel being formed, the body 19 of such vessel being mounted within a suitable supporting casing, as 20, which is mounted upon an upright sleeve 21, being supported by a collar 22 which is threaded upon said sleeve. Said sleeve has its lower end held by and is vertically slidable and rotatable in a guide plate 23 which is supported by a table 24 mounted on the front wall of the casing 2. The body of said sleeve is exteriorly threaded and the collar 22 is adjustably mounted thereon in supporting relation to said casing 20. A jam-nut 66 is adapted for seating against the under face of said collar 22 for holding the latter in adjusted position. Said sleeve has a fixed collar 25 which normally rests upon the guide plate 23, sustaining the weight of said sleeve and attached parts.

The guide plate 23 is pivoted to the table at a point, as 26, located laterally with respect to the axial line of the sleeve 21 when the latter occupies operative position, and said plate is adapted to be swung outward on its pivot 26 over the table for carrying the casing 20 from beneath the holder 17 to a point where access may be had to said casing for inserting and removing ware. A stop 27 is provided on the table to be engaged by said plate when operative position is assumed, as shown in Fig. 4.

Mounted in a sleeve 28 which is vertically movable through said table 24 is a pivotally disposed rod 29 of a material readily conductive of electric current, said rod being insulated from said sleeve 28 and having a head or collar 30 at its upper end which is adapted to rest upon an internal annular shoulder or seat 31 provided at the upper end of the sleeve 28. The sleeve 28 has an external annular flange 32 at its upper end which normally rests on a seat, provided in said table, below the level of the top surface of the latter, supporting the head 30 of the rod 29 below said surface. Disposed within the rotatable sleeve 21 and insulated from the latter is a vertical non-rotatable rod 33 which is also conductive of electric current and which is adapted to be contacted at its lower end by the rod 29 when the latter is elevated. A collar 34 is adjustably mounted on the rod 29 below the sleeve 28 and has pivotally connected thereto a yoke 35 carried on the end of an arm 36 which is fixed upon a shaft 37 journaled in web-like supports 38 formed on the under side of the table. Said shaft has fixed on one end thereof one end of an arm 39 the opposite end of which is pivotally connected to the upper end of an upright link 40 whose lower end is pivotally connected to a lever or foot treadle 41 which is pivoted at a suitable point, as upon the base 1. Mounted upon the upper end of the rod 33 is a laterally directed arm 42 which carries upon its outer end a wheel electrode 43 adapted to engage the inner surface of the article and which constitutes one of the welding electrodes employed in the welding operation.

Mounted on the front face of the pedestal 4 beneath the arm 5 thereof and vertically adjustable with respect to said pedestal is one end of a horizontally disposed bar 44 on which is horizontally adjustable a forwardly extending arm 45, said arm preferably having dove-tail connection with said bar, as is clearly shown in Figs. 1, 3 and 5. Pivotally mounted upon the top of the free end of said arm 45 is one end of a hand-lever 46, said end of said lever being disposed within a box-like casting 47 rigidly carried by said arm. Pivotally connected at one end to said casting is a bar 48 which has a wheel electrode 49 mounted thereon at a suitable point for being thrust, by inward movement of said bar 48, into opposing relation to electrode 43 for welding the bottom 18 to the body 19 of the ware disposed within the supporting casing 20.

Current is conducted from the transformer 3 to the electrode 49 through a vertically disposed rod 50 connected at one end to said transformer, thence through an arm 51 which is vertically slidable on said rod 50, thence through a horizontally disposed rod 52 which is slidable through the front end of said arm 51 and which has its opposite ends mounted on the bar 44, thence through a collar 53 and connected rod 54, said collar being slidably mounted on said rod 52 and said rod 54 being directed outward through the hollow interior of arm 45 and connected to the pivot pin 55 on which hand lever 46 is mounted, thence through said pivot 55, casting 47, and finally through bar 48 in which said electrode is mounted. The electric circuit through the opposite electrode 43 is closed only when the rod 29 and externally threaded sleeve 21 are elevated by the depression of the treadle 41, this action serving not only to elevate said members for carrying the body of the ware and said electrode to proper positions, but also to carry the alined current conducting rods 29 and 33 into contact. Current is conducted from the transformer to the rod 29 through a flexible copper conductor, as 56, leading from said transformer, and an attached collar 57 in which said rod 29 is adjustably held.

The table 24 is vertically adjustable on the casing 2. For elevating and lowering the table, an adjusting screw 58 is provided, said screw having its upper end swiveled in a bearing 59 provided on the under side of said table and being threaded through the hub of a hand wheel 60 which is mounted on a stationary arm or bracket 61 carried by the base 1. An adjusting screw 62 is provided by means of which the arm 45 may be adjusted on the bar 44, said screw having swiveled connection with a bracket 63 fixed on said bar and having its inner end threaded through a bracket 64 formed on said arm. A hand wheel 65 is provided on the outer end of said screw, as shown.

In practice, the upper edge of the body 19 of the article to be acted upon projects slightly above the edge of the casing 20, and the flange of the bottom blank 18 projects downward below the edge of the holder 17. When the casing is elevated in the manner hereinbefore described, the projecting edge of the body of the article is elevated within the embrace of the bottom flange. Coincident with the elevation of said body, contact is made between the rods 29 and 33. The wheel electrode 43 at the same time lies in engagement with the interior of that portion of the body 19 which is overlapped by the flange of bottom blank 18. Then, as is obvious, when the hand-lever 46 is moved laterally the electrode 49 is thereby thrust into engagement with said flange, closing the circuit from the transformer, and a welding current passes between said electrodes. The shaft 8 having been set in rotation just prior to thrusting the electrode 49 into engagement with the ware, it will be seen that said ware is in rotation during the performance of the welding operation. It will be noted that the casing 20, when elevated is separated from the bottom holder 17 a sufficient distance to permit of the entrance of the edge of said electrode 49 between said members.

An adjusting screw 67 is provided for adjusting the elevation of the bar 44 and the associated parts carried thereby, said screw being threaded through the hub of a hand-wheel 68 mounted in a fixed position on the casing 2 and having its upper end disposed in swiveled supporting relation to said bar.

The rod 33 carrying the fixed arm 42 upon which is mounted wheel electrode 43 is prevented from rotating by any appropriate means, as by a laterally disposed stud 69 carried adjacent to its lower end, said stud being disposed within a vertical groove or slideway 70 provided in the guide plate 23, as shown in Fig. 7. The described means for preventing rotation of said rod 23 is merely illustrative and is not claimed specifically as part of the invention.

What I claim is—

1. In a machine for electrically welding ends on tubular bodies, a rotatable support for an end blank, a support for the tubular body, means for moving one of said supports toward the other to introduce said body and said blank into proper relative engaging positions, an electrode disposed within said body, an electrode disposed without said body and adapted for movement into coöperative relation to the first mentioned electrode, means for rotating the body and the end blank between said electrodes, and a transformer circuit for said electrodes, normally disconnected portions of said circuit being connected when said body and said blank assume engaging positions.

2. In a machine for electrically welding ends on tubular bodies, a rotatable support for an end blank, a support for the tubular body, means for laterally moving the body support into and out of registry with the end support, means for shifting said body support endwise toward the end support to introduce the body into proper position in engagement with the end blank, a pair of electrodes disposed in coöperative relation, and means for rotating the body and end blank between said electrodes.

3. In a machine for electrically welding bottoms on tubular bodies, a rotatable support for a flanged bottom blank, a support for the tubular body, means for moving the body support laterally into and out of registry with said bottom support, means for shifting one of said supports endwise to introduce the end of said body within the embrace of the flange of said bottom for forming a joint, and electrodes operating against the internal and external surface at said joint.

4. In a machine for electrically welding bottoms on tubular bodies, a rotatable support for a flanged bottom blank, a support for the tubular body, means for moving the body support laterally into and out of registry with said bottom support, means for shifting one of said supports endwise to introduce the end of said body within the embrace of the flange of said bottom for forming a joint, and electrodes operating against the internal and external surface at said joint, one of said electrodes being movable to and from operative position.

5. In a machine for electrically welding bottoms on tubular bodies, a rotatable support for a flanged bottom blank, a support for the tubular body, means for moving the body support laterally into and out of registry with said bottom support, means for shifting one of said supports endwise to introduce the end of said body within the embrace of the flange of said bottom for forming a joint, and electrodes operating against the internal and external surface at said joint, and means for rotating the support for the bottom blank.

6. In a machine for electrically welding bottoms on tubular bodies, a rotatable support for a flanged bottom blank, a support for the tubular body, means for moving the body support laterally into and out of registry with said bottom support, means for shifting one of said supports endwise to introduce the end of said body within the embrace of the flange of said bottom for forming a joint, wheel electrodes disposed within and without said body and adapted to operate against the internal and external surfaces of said joint, and means for moving the outer electrode to and from operative position.

7. In a machine for electrically welding bottoms on tubular bodies, a rotatable support for a flanged bottom blank, a support for the tubular body, means for moving the body support laterally into and out of registry with said bottom support, means for shifting one of said supports endwise to introduce the end of said body within the embrace of the flange of said bottom for forming a joint, wheel electrodes disposed within and without said body and adapted to operate against the internal and external surfaces of said joint, means for moving the outer electrode to and from operative position, a transformer, and means conducting current from said transformer to said electrodes, the transformer circuit being closed by contact of the outer electrode with the joint.

8. In a machine for electrically welding bottoms on tubular bodies, a transformer, a table; an apertured guide-plate mounted upon said table and shiftable to and from a centered position with respect to the latter, a body support disposed over and movable with said guide, a vertical rod for conducting electric current having its upper end disposed centrally within said support and having its lower end received in the aperture of said guide-plate above the level of the table, a wheel electrode carried by said rod, a second rod having electrical connection with said transformer and operable through said table into contact with the first-mentioned rod when the guide plate occupies centered position, said second rod normally occupying a position with its lower end below the level of the table, a bottom support located over and in juxtaposition to said body support when the latter occupies centered position, means for elevating said body support to an operative position wherein portions of the bottom and body overlap, a second wheel electrode adapted to coöperate with the first-mentioned electrode for closing an electric circuit through said overlapped portions, and means for rotating one of said supports.

9. In a machine for electrically welding bottoms on tubular bodies, a transformer, a table, an apertured guide-plate mounted upon said table and shiftable to and from a centered position with respect to the latter, a body support disposed over and movable with said guide, a vertical rod for conducting electric current having its upper end disposed centrally within said support and having its lower end received in the aperture of said guide-plate above the level of the table, a wheel electrode carried by said rod, a second rod having electrical connection with said transformer and operable through said table into contact with the first-mentioned rod when the guide plate occupies centered position, said second rod normally occupying a position with its upper end below the level of the table, a bottom support located over and in juxtaposition to said body support when the latter occupies centered position, means for elevating said body support to an operative position wherein portions of the bottom and body overlap, a second wheel electrode adapted to coöperate with the first-mentioned electrode for closing an electric circuit through said overlapped portions, and gearing whereby rotation is imparted to the bottom support.

In testimony whereof, I affix my signature in presence of two subscribing witnesses.

WILLIAM E. ANDREWS.

Witnesses:
H. E. DUNLAP,
W. F. KEEFER.